C. E. HERMAN.
METAL TREAD FOR BLOCK TIRES.
APPLICATION FILED FEB. 8, 1913. RENEWED JAN. 8, 1914.
1,090,851.
Patented Mar. 24, 1914.
2 SHEETS—SHEET 1.
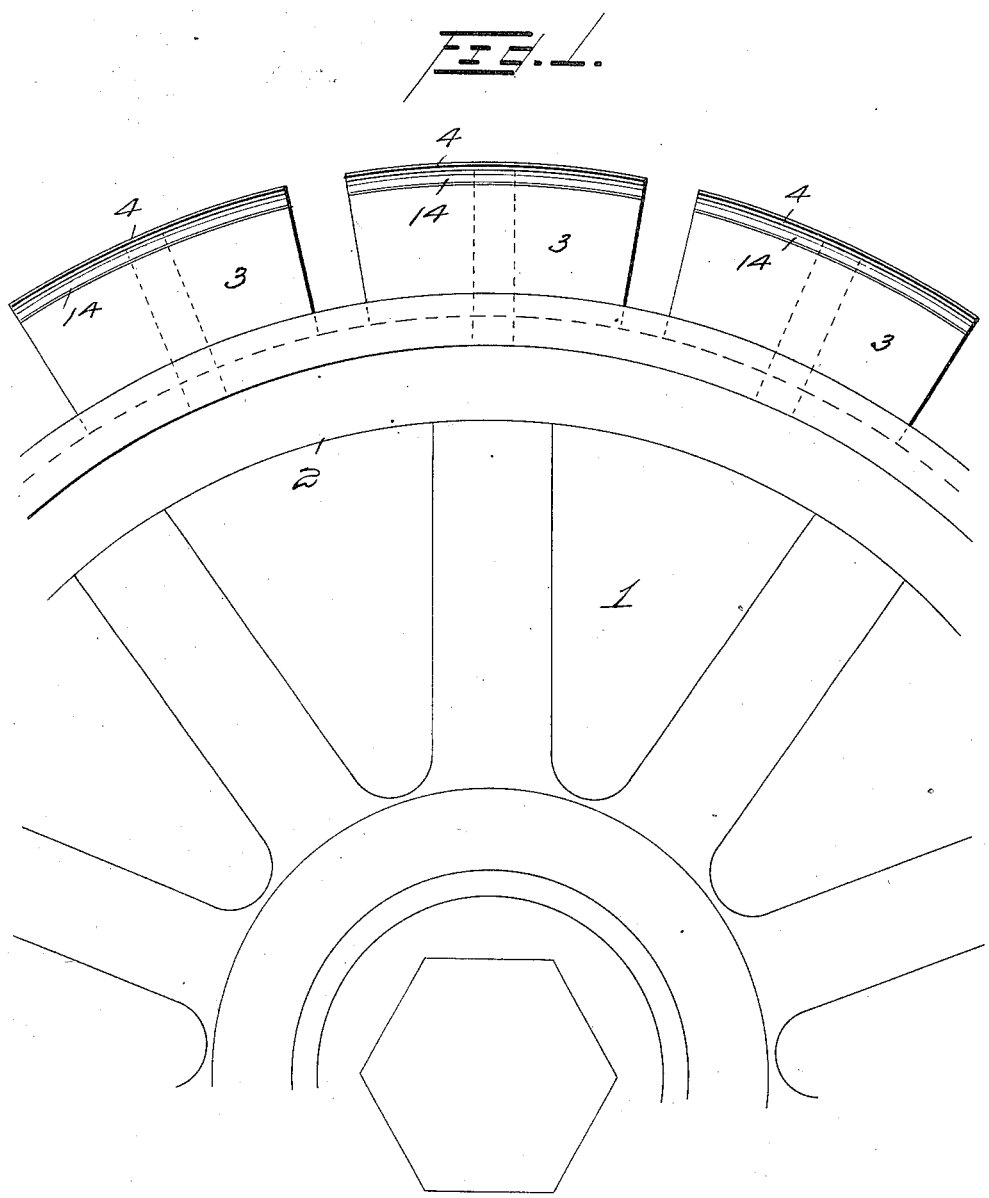
WITNESSES
INVENTOR
Clifton E. Herman
Attorney C. E. HERMAN.
METAL TREAD FOR BLOCK TIRES.
APPLICATION FILED FEB. 8, 1913. RENEWED JAN. 8, 1914.
1,090,851.
Patented Mar. 24, 1914.
2 SHEETS—SHEET 2.
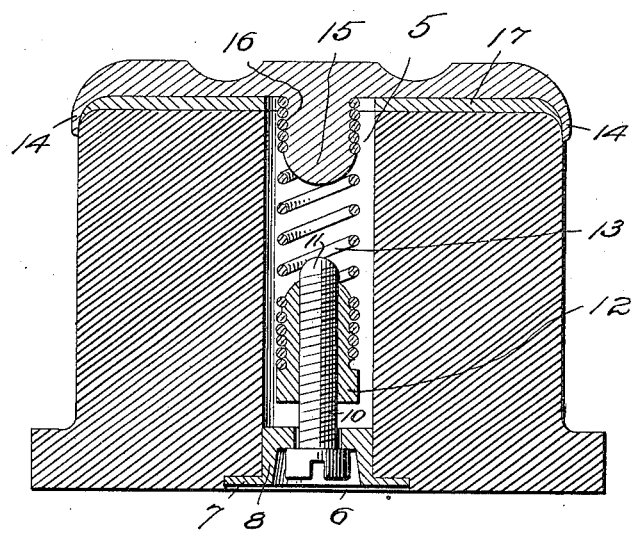
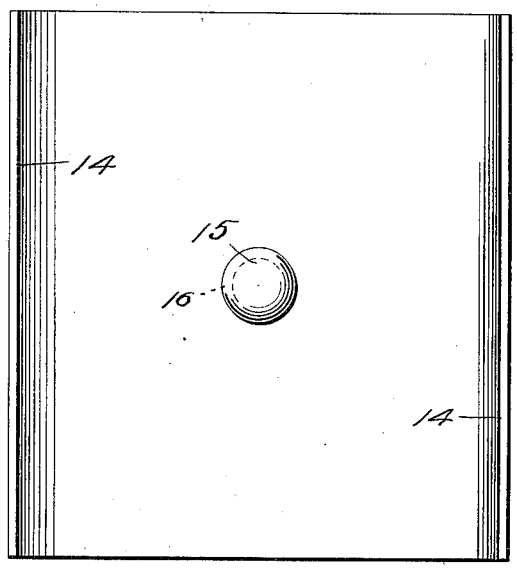
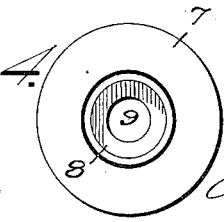
WITNESSES
INVENTOR
Clifton E. Herman
Attorney

UNITED STATES PATENT OFFICE.

CLIFTON E. HERMAN, OF COLUMBUS, OHIO, ASSIGNOR OF ONE-HALF TO STERLING C. MUNSON, OF COLUMBUS, OHIO.

METAL TREAD FOR BLOCK-TIRES.

1,090,851.  Specification of Letters Patent.  Patented Mar. 24, 1914.

Application filed February 8, 1913, Serial No. 747,019. Renewed January 8, 1914. Serial No. 811,099.

*To all whom it may concern:*

Be it known that I, CLIFTON E. HERMAN, a citizen of the United States, residing at Columbus, in the State of Ohio, have invented certain new and useful Improvements in Metal Treads for Block-Tires, of which the following is a specification.

This invention relates to new and useful improvements in metal treads for block tires.

The object of my invention is to provide a metal wearing surface that can be renewed at a small cost.

With the foregoing and other objects in view, the invention consists in the novel features of construction, combination and arrangement of parts illustrated in the drawings and more particularly pointed out in the appended claim.

In the accompanying drawings:—Figure 1 is a fragmentary side elevation of a portion of an automobile wheel equipped with my invention. Fig. 2 is a central vertical transverse sectional view of one of the tread plates or shoes and the corresponding tread member of the tire with the parts represented on an enlarged scale. Fig. 3 is a bottom plan view of the metal tread, and Fig. 4 is a detail plan view of one of the bearing plates.

Referring to the drawings for a more particular description of the invention and which drawings are for illustrative purposes only and are therefore not drawn to scale, 1 indicates the wheel, 2 the rim, 3 the rubber treads of the ordinary block tire and 4 the metal tread plates or shoes.

In carrying out the invention, each of the tread members of the tire is provided with a central opening 5 the purpose of which will be presently disclosed.

The inner or lower end of each opening 5 is provided with an annular socket 6 to receive the flange 7 of the cylindrical bearing plates 8 formed with central openings 9 to receive the body portions or shanks 10 of the bolts 11. Nipples 12 are screwed on the shanks of the bolts and said nipples are exteriorly threaded for the purpose of providing a screw threaded connection with the inner ends of the spiral springs 13.

The tread plates or shoes are provided at opposite side edges with the inwardly bent flanges 14 which embrace opposite side edges of the rubber treads 3 and at their inner faces with centrally disposed inwardly extending nipples 15 which are exteriorly screw threaded, as at 16, to receive the upper ends of the spiral springs previously mentioned. The nipples 15 extend into the outer ends of the openings 5, as shown in the drawings.

Friction pads 17 of suitable material are arranged or interposed between the metal tread plates or shoes and the rubber treads, as shown in the drawings.

The spiral springs hold the tread plates in position and at the same time allow the tread plates to assume any angle required as the rubber treads of the tire are compressed.

As pointed out in the introductory remarks, the tread plates provide a metal wearing surface that may be removed and replaced at any time at a small cost, thus indefinitely prolonging the life of the tire.

From the foregoing description taken in connection with the drawings, it is thought that the construction and advantages of this invention will be understood without requiring a more extended explanation.

Various changes in the form, proportions and minor details of construction may be resorted to without departing from the principles or sacrificing any of the advantages of this invention as defined in the appended claim.

Having described my invention, what I claim as new is:—

In combination, a metal tread plate for block tires provided with an inwardly extending exteriorly threaded nipple, a bearing plate extending into the base of the corresponding tread member of the tire in alinement with the nipple of the tread plate, a bolt arranged with its shank extending through the bearing plate into the tread member of the tire, an exteriorly threaded nipple screwing on the shank of the bolt and a spiral spring arranged with opposite ends screwing on said nipples, the tread member of the tire having a central opening formed therein to receive said nipples, the bearing plate, the spiral spring and the bolt.

In testimony whereof I affix my signature in presence of two witnesses.

CLIFTON E. HERMAN.

Witnesses:
VAN S. SMELTZER,
THOS. H. BENNETT,

Copies of this patent may be obtained for five cents each, by addressing the "Commissioner of Patents, Washington, D. C."